(12) United States Patent
Verma et al.

(10) Patent No.: US 9,813,496 B2
(45) Date of Patent: Nov. 7, 2017

(54) METHOD AND APPARATUS FOR COLLABORATING IN A WORK ENVIRONMENT

(71) Applicant: Infosys Limited, Bangalore (IN)

(72) Inventors: Udayan Verma, Patiala (IN); Praveen Kumar Dehury, Bhubaneswar (IN); Vinu Sivasankaran, Palakkad (IN); Jitin Sreenivasan, Kottayam (IN); Prasanna Natarajan, Madurai (IN)

(73) Assignee: Infosys Limited, Bangalore (IN)

( * ) Notice: Subject to any disclaimer, the term of this patent is extended or adjusted under 35 U.S.C. 154(b) by 560 days.

(21) Appl. No.: 13/896,468

(22) Filed: May 17, 2013

(65) Prior Publication Data

US 2013/0325962 A1 Dec. 5, 2013

(30) Foreign Application Priority Data

May 23, 2012 (IN) .......................... 2053/CHE/2012

(51) Int. Cl.
*H04L 29/08* (2006.01)
*H04L 12/18* (2006.01)
*H04L 12/58* (2006.01)

(52) U.S. Cl.
CPC ...... *H04L 67/1044* (2013.01); *H04L 12/1822* (2013.01); *H04L 51/04* (2013.01); *H04L 51/26* (2013.01)

(58) Field of Classification Search
CPC ............. H04L 67/1044; H04L 12/1822; H04L 67/02; H04L 65/403; H04L 67/42; H04L 29/06047; H04L 45/22; H04L 67/2814; H04L 51/16; H04L 12/1818; H04L 65/1069; H04L 67/10; H04L 51/04; H04L 51/26; H04L 63/10; H04L 61/101; H04L 12/1813
USPC ........................................................ 709/204
See application file for complete search history.

(56) References Cited

U.S. PATENT DOCUMENTS

| | | | | |
|---|---|---|---|---|
| 6,070,142 A * | 5/2000 | McDonough | .......... | G06Q 10/06 379/225 |
| 6,941,372 B2 * | 9/2005 | Pearson | ................. | H04H 60/80 709/203 |
| 7,644,144 B1 * | 1/2010 | Horvitz | ................. | G06Q 10/10 709/203 |
| 8,050,255 B2 * | 11/2011 | Sidhu | ................ | H04M 3/42382 370/353 |

(Continued)

*Primary Examiner* — Patrice Winder
*Assistant Examiner* — Abderrahmen Chouat
(74) *Attorney, Agent, or Firm* — Klarquist Sparkman, LLP

(57) ABSTRACT

The disclosed embodiments relate to a method, apparatus, and computer-readable medium for improving collaborative communications that can be implemented using either centralized or decentralized modes, or combinations thereof. An exemplary method comprises receiving information corresponding to a user of a collaboration platform, the collaboration platform being associated with a plurality of collaboration channels; determining at least one of the collaboration channels to be most relevant for the user based on the received information; and routing the user to the at least one collaboration channel determined to be the most relevant for the user. The disclosed embodiment further utilizes discussions as a way of communicating to solve problems and incidents.

14 Claims, 10 Drawing Sheets

(56) References Cited

U.S. PATENT DOCUMENTS

| | | | | |
|---|---|---|---|---|
| 8,166,178 B2* | 4/2012 | Horvitz | G06Q 10/10 | 455/414.1 |
| 8,266,207 B2* | 9/2012 | Dugan | G06Q 10/107 | 709/204 |
| 8,402,148 B2* | 3/2013 | Horvitz | G06Q 10/10 | 709/227 |
| 2007/0064912 A1* | 3/2007 | Kagan | H04M 3/5232 | 379/265.1 |
| 2008/0114847 A1* | 5/2008 | Ma | G06Q 50/184 | 709/206 |
| 2008/0133731 A1* | 6/2008 | Bradley | G06F 21/10 | 709/223 |
| 2008/0201441 A1* | 8/2008 | Bodic | H04L 12/58 | 709/206 |
| 2008/0244418 A1* | 10/2008 | Manolescu | G06Q 10/00 | 715/753 |
| 2010/0250643 A1* | 9/2010 | Savage | G06Q 10/107 | 709/202 |
| 2011/0276396 A1* | 11/2011 | Rathod | G06F 17/30867 | 705/14.49 |
| 2015/0010139 A1* | 1/2015 | Tuchman | G06Q 30/0601 | 379/265.09 |

* cited by examiner

000
METHOD AND APPARATUS FOR COLLABORATING IN A WORK ENVIRONMENT

RELATED CASE INFORMATION

This application claims priority to Indian Application No. 2053/CHE/2012, filed May 23, 2012, the disclosure of which is incorporated herein in its entirety.

FIELD OF THE INVENTION

The invention relates to a method and apparatus for improving collaborative communications.

SUMMARY

The disclosed embodiment relates to computer-implemented method executed by one or more computing devices for improving collaborative communication. An exemplary method comprises receiving, by at least one of the one or more computing devices, information corresponding to a user of a collaboration platform, the collaboration platform being associated with a plurality of collaboration channels, determining, by at least one of the one or more computing devices, at least one of the collaboration channels to be most relevant for the user based on the received information, and routing, by at least one of the one or more computing devices, the user to the at least one collaboration channel determined to be the most relevant for the user.

The disclosed embodiment further relates to an apparatus for improving collaborative communication. An exemplary apparatus comprises one or more processors, and one or more memories operatively coupled to at least one of the one or more processors and storing instructions that, when executed by at least one of the one or more processors, cause at least one of the one or more processors to receive information corresponding to a user of a collaboration platform, the collaboration platform being associated with a plurality of collaboration channels, determine at least one of the collaboration channels to be most relevant for the user based on the received information, and route the user to the at least one collaboration channel determined to be the most relevant for the user.

Furthermore, the disclosed embodiment relates to at least one non-transitory computer-readable medium storing computer-readable instructions that, when executed by one or more computing devices, improve collaborative communication, the instructions causing at least one of the one or more computing devices to receive information corresponding to a user of a collaboration platform, the collaboration platform being associated with a plurality of collaboration channels, determine at least one of the collaboration channels to be most relevant for the user based on the received information, and route the user to the at least one collaboration channel determined to be the most relevant for the user.

In addition, the information corresponding to the user of the collaboration platform may corresponding to the user includes user profile information. Also, the collaboration channels may be adapted to receive collaboration data associated with users, and the information corresponding to the user may include collaboration data associated with the user. The collaboration data may also include discussion information. Moreover, the information corresponding to the user may also be routed to the at least one collaboration channel determined to be the most relevant for the user, and the collaboration data may be stored for later use.

DETAILED DESCRIPTION

Figure 1:
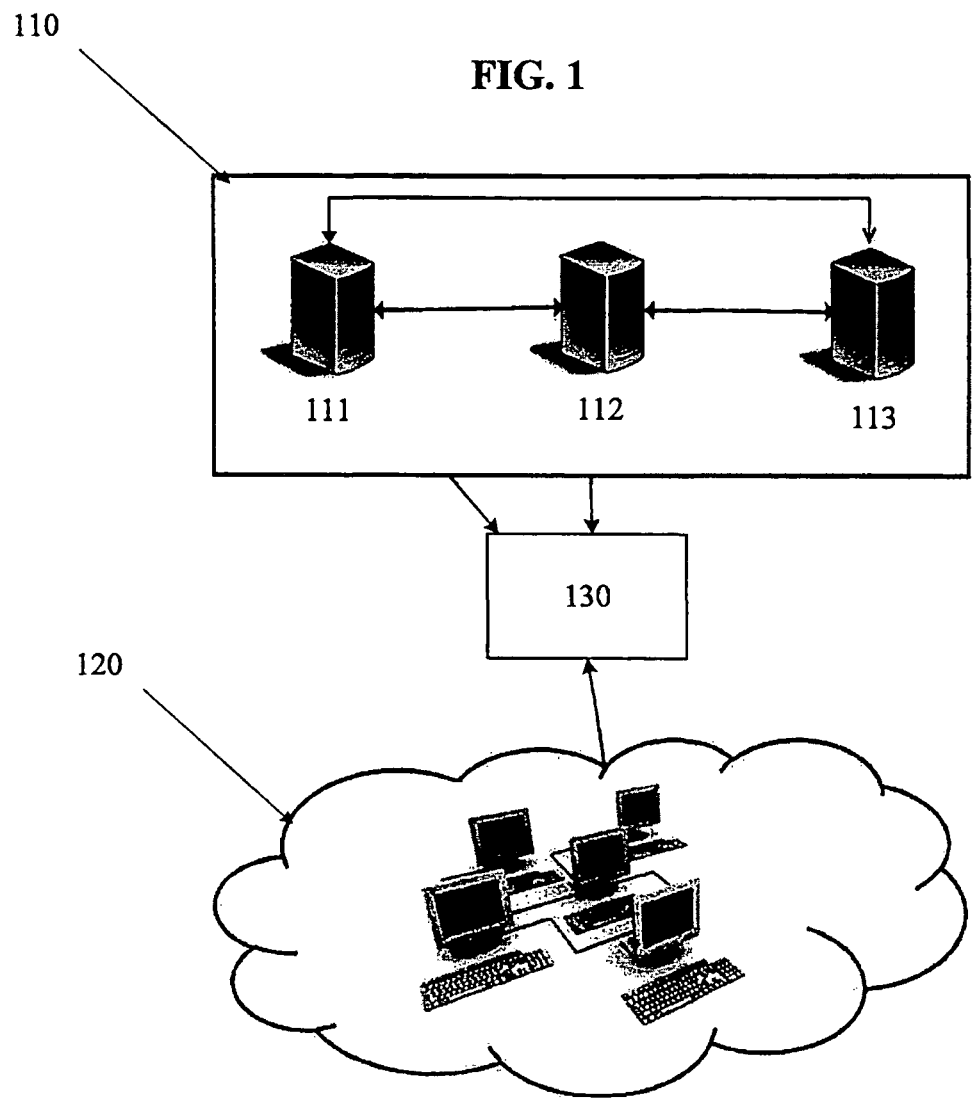
FIG. 1 illustrates an exemplary mixed mode configuration according to the disclosed embodiment.

In current communication platform scenarios, technology based chat sessions are typically limited to one to one (or private) sessions. Thus, delivering the results of a chat session to an entire team in a collaborative setting can be time consuming.

The disclosed embodiment overcomes the difficulties of existing systems in team or collaborative communications. The disclosed embodiment enables team members to be divided into different channels/rooms depending on different technology areas and roles based on information such as user profile information or collaboration data extracted from chat messages or other sources. This provides a better way of group communication than the existing systems.

The disclosed embodiment thus provides an effective communication model for use which enables the members/users to increase their communication and efficiency. Users as a group can share their views through this platform which can make the discussions more effective. By segregating users into different channels/rooms/as per the business objectives will contribute to the overall productivity of the team. Also, discussions and other types of collaboration data can be recorded, thereby contributing to the knowledge base so that any future discussions on the same topic will benefit from the knowledge base.

As described herein, the disclosed embodiment enables users to participate in collaborative communications on collaboration platforms more effectively. The collaboration channels (or chat channels) can facilitate a common ground for discussion between channel members, and any recording based thereon (i.e. transcripts, etc.) can be stored and saved for future references. If a user wants to review the topic and discussion, the stored recording can be retrieved and reviewed. In addition, the disclosed embodiment can be synchronized with external monitoring tools or can act as a feed to other applications as well.

Specifically, the disclosed embodiment relates to computer-implemented method executed by one or more computing devices for improving collaborative communication. An exemplary method comprises receiving, by at least one of the one or more computing devices, information corresponding to a user of a collaboration platform, the collaboration platform being associated with a plurality of collaboration channels, determining, by at least one of the one or more computing devices, at least one of the collaboration channels to be most relevant for the user based on the received information, and routing, by at least one of the one or more computing devices, the user to the at least one collaboration channel determined to be the most relevant for the user.

The disclosed embodiment further relates to an apparatus for improving collaborative communication. An exemplary apparatus comprises one or more processors, and one or more memories operatively coupled to at least one of the one or more processors and storing instructions that, when executed by at least one of the one or more processors, cause at least one of the one or more processors to receive information corresponding to a user of a collaboration platform, the collaboration platform being associated with a plurality of collaboration channels, determine at least one of the collaboration channels to be most relevant for the user based on the received information, and route the user to the at least one collaboration channel determined to be the most relevant for the user.

Furthermore, the disclosed embodiment relates to at least one non-transitory computer-readable medium storing computer-readable instructions that, when executed by one or more computing devices, improve collaborative communication, the instructions causing at least one of the one or more computing devices to receive information corresponding to a user of a collaboration platform, the collaboration platform being associated with a plurality of collaboration channels, determine at least one of the collaboration channels to be most relevant for the user based on the received information, and route the user to the at least one collaboration channel determined to be the most relevant for the user.

In addition, the information corresponding to the user of the collaboration platform may corresponding to the user includes user profile information. Also, the collaboration channels may be adapted to receive collaboration data associated with users, and the information corresponding to the user may include collaboration data associated with the user. The collaboration data may also include discussion information. Moreover, the information corresponding to the user may also be routed to the at least one collaboration channel determined to be the most relevant for the user, and the collaboration data may be stored for later use.

High Level Architecture—Components

The disclosed embodiment can be implemented using either centralized or decentralized modes, or combinations thereof, as described below.

Centralized Mode:

This is the typical client-server model where a server resides at a remote location and all the clients connect to the server. The clients send messages to the server which broadcasts the messages to the respective audience. Thus, there are centralized servers that act as anchors for channels, and the servers can store data to the database. There are preferably options to configure the number of servers, and users user can opt for as many servers as needed.

Decentralized Mode:

In decentralized mode, there are preferably no dedicated servers, and users/clients can act as anchor servers for each channel. Load balancing is inherent in this mode. If a particular user or client is experiencing high load because of hosting too many channels, some of the channels can be migrated to another user or client who is experiencing a lower load. Performance increases with the number of users using the system, as there are more configurations utilizing the shared load.

In this configuration, the number of the anchors is configurable. For the sake of explanation, it is assumed that there are three anchors: primary, secondary, and tertiary. The Primary Server is one of the machines which is also a member of the channel that acts like a main server and may hosts one or more channels and their respective discussions. It is also responsible for updating the chat/discussions to the central database for future reference. The primary server generates a unique sequence number for each message that it receives from all the Users of the Channels that it is hosting so that it keeps track of the order of the messages that it receives or distributes. The Secondary Server serves as the backup which receives all the messages just as the Primary, but does not broadcasts it unless the Primary fails. Secondary would maintain all the information maintained by the Primary. The Secondary server will maintain a message queue which will be emptied as and when it is notified by Primary of the last message's ID that it had updated in the DB. When the Secondary becomes the Primary, it will broadcast messages with the sequence number one greater than the last sequence number it received. The Tertiary Server serves as the backup for the Secondary. The only difference between a Secondary and a Tertiary is that users don't send the messages to Tertiary and hence there's no connection between the tertiary and the users. When the Secondary fails, the Tertiary would become the new Secondary and also the former Tertiary would find a new Tertiary among the active participants of the Channel. Since the tertiary is a part of the Channel's discussion, it would also receive every message that the Primary sends. When the Primary fails or is experiencing problems, the Secondary becomes the new Primary and the Tertiary becomes the new Secondary while a new Tertiary is found.

Mixed Mode:

In mixed mode, which is the preferred mode of the disclosed embodiment illustrated in FIG. 1, a combination of centralized servers 110 and a network of decentralized servers 120 can be used. Centralized servers 110 can include a centralized primary server 111 and any number of load balanced servers 112 and 113, and both the centralized servers 110 and the decentralized servers 120 can store data on a centralized database 130.

The primary channels are preferably hosted on centralized servers to ensure high availability, while knowledge and general channels can be hosted in the decentralized mode. When the server experiences load, it can migrate some of the channels to users or clients who are free to handle the load. In this configuration, if the centralized servers fail, the crucial channels will operate in a decentralized mode till the time the main servers come up. This mixed mode ensures that all the channels are always available.

Channels that are very important or heavily loaded, that needs to be active all the time and can impact the business will not be in a decentralized mode. Ordinary users' machines can't be trusted with such matters of importance. Support channels are examples for this kind of crucial channels. These channels will/can be hosted in a centralized server that the customer has provided. If the customer can afford, a secondary and also a tertiary server can be set up as centralized servers to be as backups for the main server. Every client, on starting up, will fetch this information from a configuration file or from the client-side database. In case when the server details have to be changed, the configuration file at the client can be pushed to the clients over the network through SCCM (Systems Center Configuration Manager).

Since these channels are ideally available all the time, their connection details are always present in an active Channels table. And in cases where the centralized Secondary or Tertiary goes down, to prevent the rest of the channels from taking up the anchor roles as in a decentralized mode, channels can be classified into two categories—central channels and dynamic channels. So when a user attempts to become a Secondary or Tertiary when the Primary is alive for a special channel, the attempt would fail as the channel is central.

But when the Primary of such a channel goes down, users will not be able to access it. And the first user to do find it will act as a Primary till the time the actual Primary comes up. When the original Primary goes down, because of socket exception the user will come to know of it. He will then update the record for that channel in the active Channels table by making himself the channel's Primary. When the original Primary comes up from failure, it will read the active Channels table and find that someone else had taken up his position, He will send a special message asking the current primary to relinquish the control which will cause the temporary Primary to drop control. The users will be intimated of the original Primary by a special message from the temporary Primary, for example.

It should be noted that critical channels such as Support channels (For example, Computers and Communication Channel, Unix channel, etc.) should not typically be allowed to run in distributed mode. Such channels should be hosted in central servers that are load-balanced and backed up efficiently. Knowledge channels should preferably be in the decentralized mode as it is not that crucial to the business as a support channel.

The ability to use whether the decentralized, centralized or mixed mode is itself configurable (in the master configuration file). When the customer can afford to have powerful and expensive server machines, then the important channels can be made to run in centralized mode. If not, then even they can be made to run in a decentralized mode.

Heat Map

Figure 2:
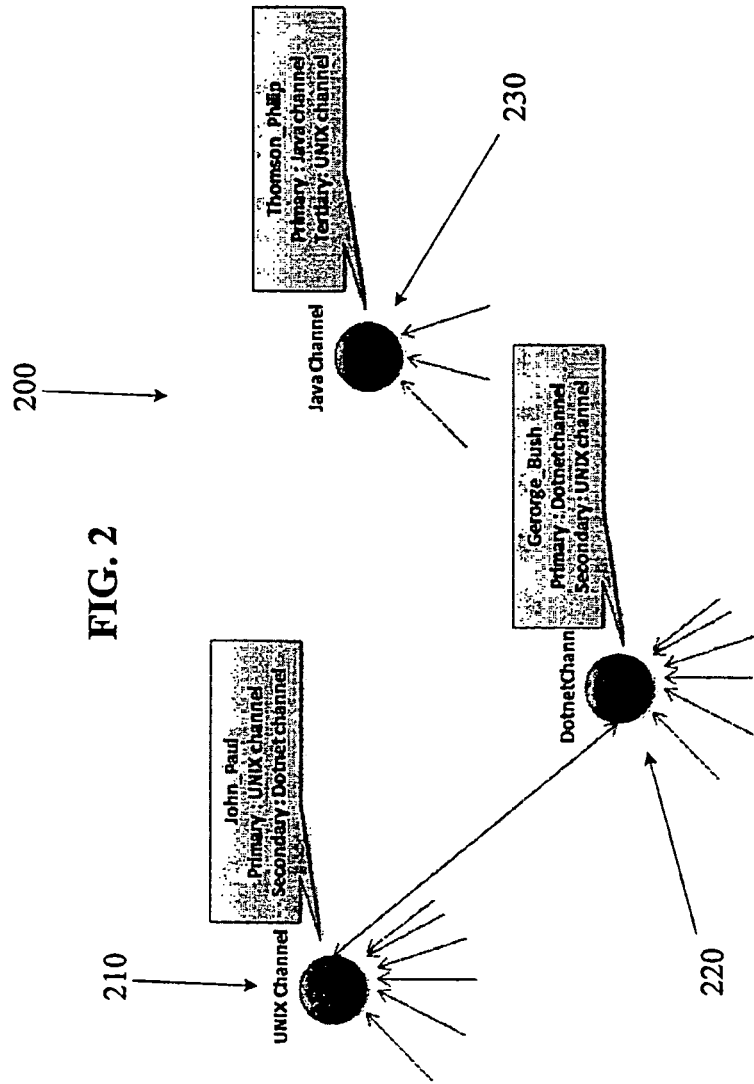
FIG. 2 illustrates a heat map according to the disclosed embodiment.

FIG. 2 illustrates a heat map 200 which is an interactive visual representation of channel locations. A system administrator can use the heat map to detect trouble spots and migrate channels present in that location to some other 'less crowded' place thereby avoiding trouble in a proactive manner. For example, in heat map 200, an administrator may find that there are more number of users connected to the UNIX channel 210 than either of the Dotnet channel 220 or the Java channel 230. In case he finds the trend growing steadily in a particular duration of time, then he can manually migrate that channel by simply right-clicking on the icon and selecting the 'Migrate Channel' option. By default, that action would migrate to the corresponding Secondary channel.

Channels

As used herein, collaboration channels refer generally to exemplary channels such as chat rooms and the like. Channels are the mode of group communication in this tool. Users will be able to open the channels based on access permissions. After opening the channel they can view the messages sent by other users and they can put in their own messages.

Channels are a medium for related messages. Messages of a particular kind flow through a particular channel. Each Channel preferably engages only a certain type or limited types of discussions. Channels help users to route their queries and comments to the appropriate audience, can be used to authorize users to specific kind of information, help answer queries that are difficult to search in online search sites, and the like. In addition, channels can be used for application monitoring, and problems can be identified immediately and resolved quickly. Channels are also dynamic, and new channels need not be created for each topic that a user wants to discuss. Based on the trend, the topics can be changed thereby reducing cost. Channels are an ideal way to share knowledge among groups and also individuals. Thus, Channels are a quick way for problem resolution. Users can get immediate and customized response for their queries. They need not search in some web application by typing detailed keywords. Since it is a live interaction with humans, it is highly likely to get a valid resolution in a quicker manner.

A few different types of channels are described herein. General Channels can be used for any general purpose. For example, general channels can be useful when a User has a simple query and knows that somebody might know the answer already. This is useful as there is no need to create SLAs and monitor them. Such channels will have a topic and end users can freely put in their ideas and views on that topic.

Support Channels are channels that can be used for discussions that are queries or otherwise need answers, assistance, and the like, and are typically unrestricted channels. These channels preferably have a support user who is responsible for resolving user's queries. Discussions in this channel may be bound by SLAs. Users can post their queries and the support users will be engaged in solving and replying to queries. In addition, a support user in a support channel will have the ability to queue many requests to himself. This would enable in the system's ability to handle more user queries. Discussions are the way through which incidents and queries are reported in the Support channel. A user initiates a chat with a support user to clarify a doubt or problem. If the support user deems it as worthy of a SLA bound discussion, he would mark the chat as a discussion upon which the SLA would begin to count down. Once the support user provided enough assistance to the user in solving the query he can mark the discussion's status as closed (Or any other status like 'escalated', 'resolved', 'pending' etc depending on the discussion status).

Alert Channels are used to provide alerts for users, and typically aren't used for discussions. User alerts can be resolved by Support Users based on Priority. Integration with other monitoring tools can be offered by web services. Monitoring tools will be exposing some methods using web services. This tool connects to those web services and catches the alerts raised there and puts them into the alert channel. This channel will be having bots. Whenever a special message that is recognizable by the bot at the alert channel is typed in any of the channel, the receiving Primary will process it and see if the user is authorized to execute such command. If it is so, the particular alert will be executed and put into the alert channel. Thus, alert channels will be used by users to raise, rectify or notify alerts. Alerts can be classified based on priority and impact. On raising an alert, predefined scripts can be executed based on the parameters provided by the user. For example, a Support User can raise an alert to restart a particular server.

Bots can be utilized to automatically execute the corrective/reactive actions for alerts. Bots are scripts that perform special and powerful actions. For example, a support user decides that to solve a particular user's query, he has to restart a particular server. So he could issue a bot command like: #iisrestart servername:blrkec122334 at the alert channel. The bot would then automatically restart the iis server found at the mentioned machine. Other examples include: #deploybuild $1239456_APP//server787878/share which would deploy the build named $1239456_APP found in the share location//server787878/share.

Knowledge Channels are channels that can be used for discussions of certain topics and to gain clarification on the topics by the end of the Discussion. These can be used to share and discuss knowledge between Users, and are preferably configurable to restrict the number of individuals per discussion. It is similar to support channel, but doesn't have an SLA. These channels are also used for knowledge sharing. Users can open this channel and communicate based on the topic of discussion. The channel owner can start a discussion in this channel by specifying a topic. Users will put in their views and the channel owner can specify an end to the discussion. When the knowledge discussion is concluded, based on the topic and the messages, keywords will be identified and saved. Apart from being able to save the entire discussion, the channel owner can choose to save only the part that he considers as the actual resolution of the initial query that was the reason for the discussion. This helps avoiding storing unwanted messages in the database.

Figure 3:
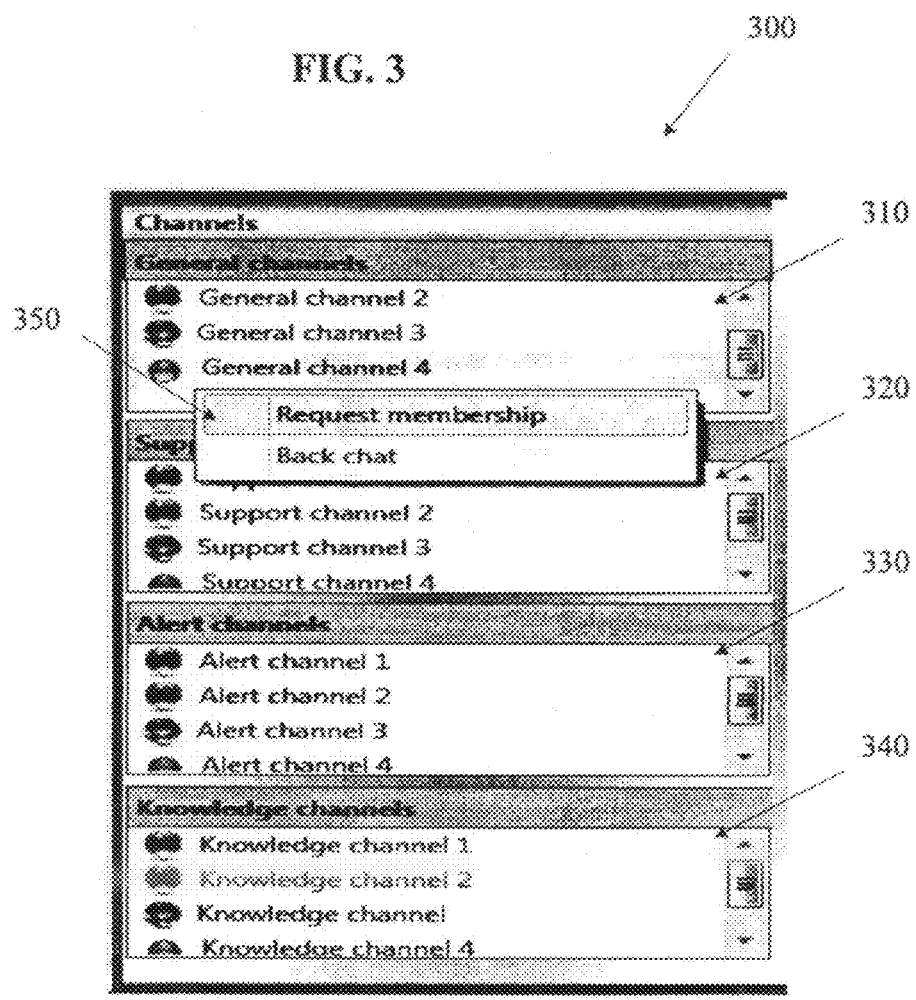
FIG. 3 illustrates an exemplary interface for requesting access to a channel according to the disclosed embodiment.

Within these general channel types, there are preferably two levels of security: open and restricted. Open channels are open to all users. Restricted Channels typically have membership requirements, and are open only to its members. A user can join such channel either by getting invited by the channel owner or by requesting for access. FIG. 3 illustrates an exemplary interface 300 for requesting access to a channel. The channels shown in FIG. 3 include general channels 310, support channels 320, alert channels 330, and knowledge channels 340. A menu 350 can be used to access menu options, such as "Request membership" to a particular channel.

Figure 4:
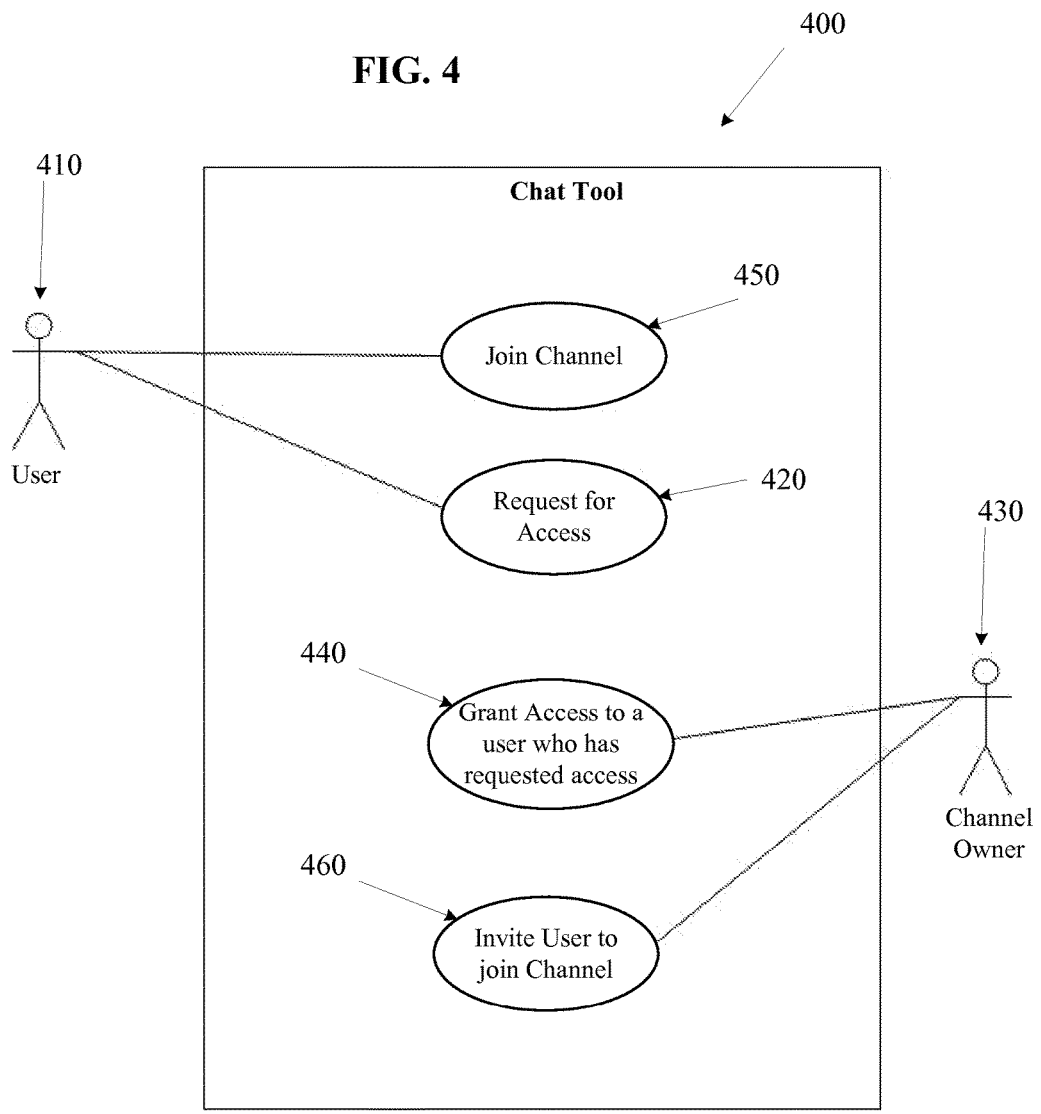
FIG. 4 illustrates an exemplary interaction that occurs when a user joins a channel according to the disclosed embodiment.

FIG. 4 illustrates a typical interaction 400 that occur when a user 410 joins a channel. First, user 410 submits a request to join a channel in step 420. The channel owner 430 or channel administrator can grant the request in step 440, at which point user 410 can join the channel in step 450. In some situations, channel owner 430 can invite user 410 to join the channel in step 460 without user 410 from making a request 420. In addition, if the channel is open, user 410 may be able to just join the channel in step 450.

Figure 5:
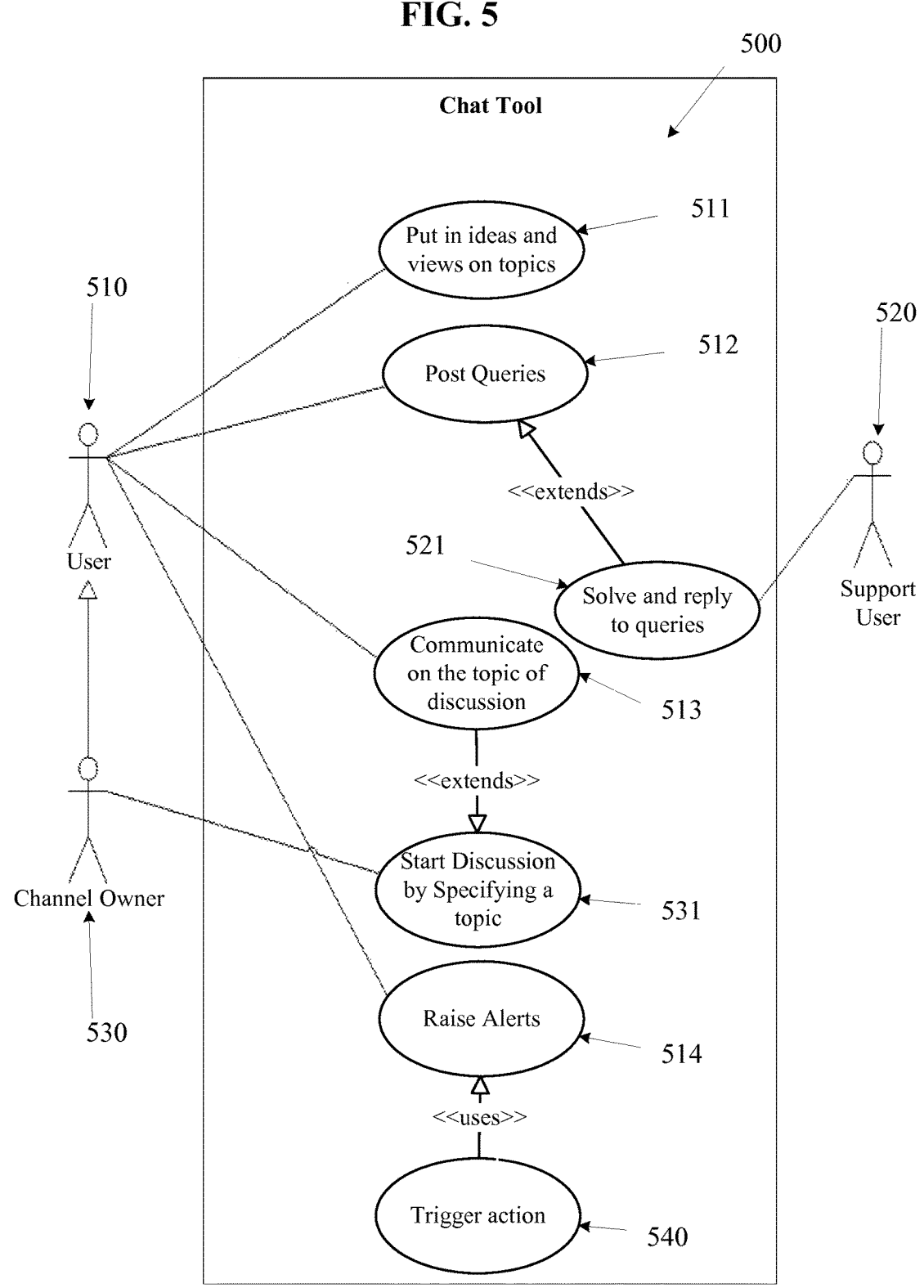
FIG. 5 illustrates an exemplary general flow of communication in various channels according to the disclosed embodiment.

FIG. 5 illustrates an exemplary general flow 500 of communication in various channels. A user 510 can put ideas and views in a topic in step 511, post queries in step 512, communicate on a topic of discussion in step 513, raise alerts in step 514, and the like. A support user 520 can solve and response to queries in step 521 and the like. A channel owner 530 can start discussions by specifying a topic in step 531, for example in response to a user communication, and may also communicate directly with user 510. In addition, actions can be triggered in response to any user raising an alert in step 540.

Figure 6:
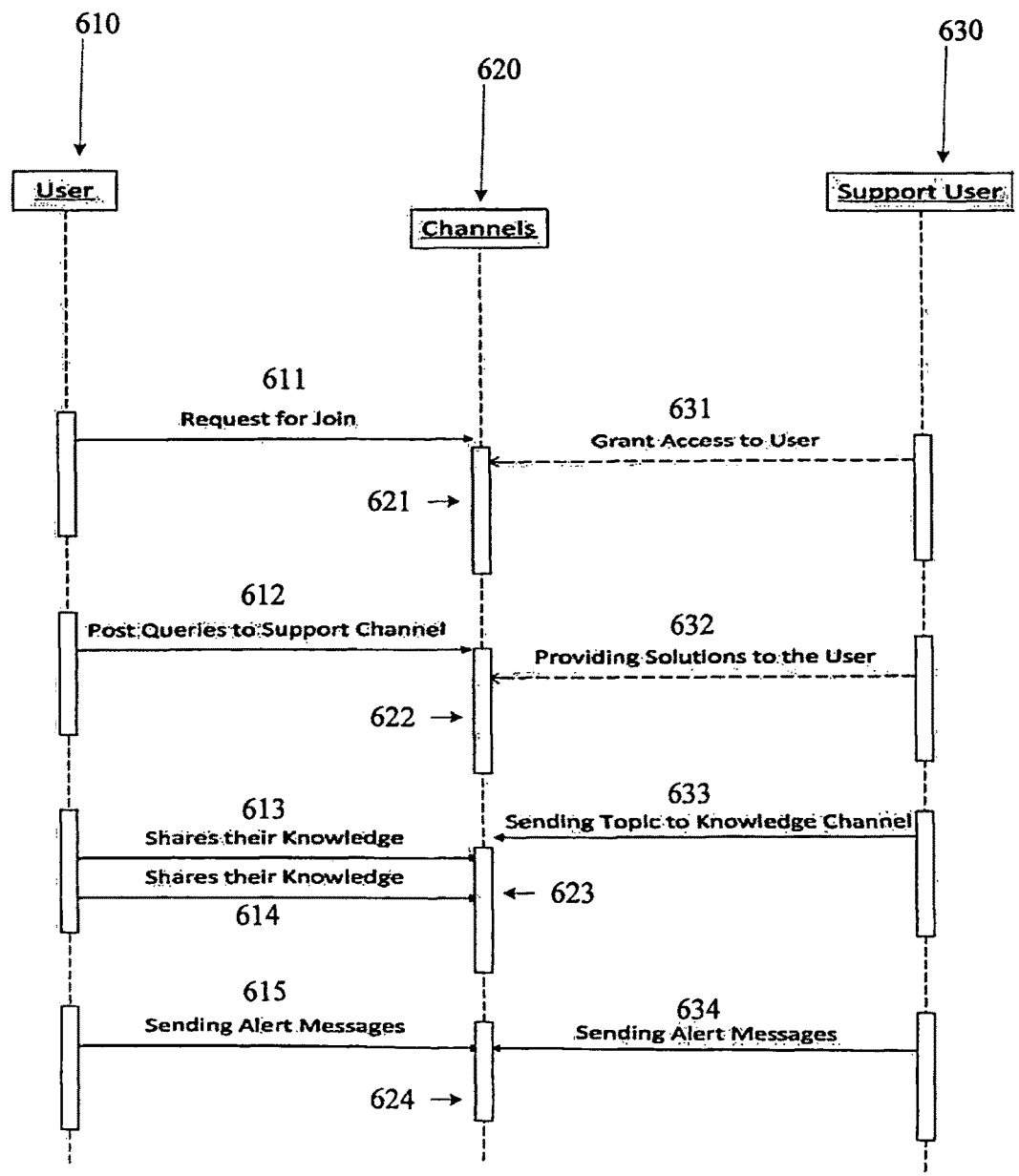
FIG. 6 illustrates exemplary communication flows through various channels between users according to the disclosed embodiment.

As noted above, each channel preferably has a set of Channel Owner, Channel Moderators and authenticated Users. Users willing to join a particular Channel have to request invitation from the Channel Owners or the Channel Owners can send invitations explicitly to Users who are currently not a part of the Channel. These notifications can be either through emails or the client application or both. Each Channel can also be identified by a Channel id. Channels can be created, modified, deleted by Users with Administrator role (link). FIG. 6 illustrates exemplary communication flows through various channels 620 between User 610 and Support User 630. Regarding general channel 621, user 610 can request to join in step 611, and support user 630 can grant access in step 631. Regarding support channel 622, user 610 can submit queries and the like in step 612, and support user 630 can provide solutions in step 632. Regarding knowledge channel 623, support user 630 can submit topics in step 633, and user 610 and other users can share their knowledge in steps 613 and 614. Regarding alert channel 624, user 610 and support user 630 can both send alert messages in steps 615 and 634.

Discussions

Discussions are a series of related messages in a Channel. A Channel can have multiple discussions. Eg., Microsoft Sharepoint Channel can have a discussion about Installation and another discussion about Sharepoint configuration. Each Discussion can be identified by a discussion name given by the discussion initiator. When a user sends a message under a new topic, the channel anchor checks to see if there's any other discussion that has the same name. If so, the user's message may be rejected, and he may be asked to participate in the already existing channel instead.

Every chat in a channel need not be a discussion. They will just be messages. But when a Support User feels that a particular chat qualifies for a Discussion, he can mark it as a Discussion. Even the User can mark a conversation as a Discussion. By default each channel starts out with a default unnamed discussion. User messages will default to this kind of discussion when they see that there's no need for a specific discussion topic. The channel anchor records these discussions in the messages table as and when he encounters a new discussion. In Support Channel and Knowledge Channel, each user can have more than one Discussion. The list of Discussions that he is a part of will be identifiable in the Channel window. Since the tool will be configured along with external tools like BMC Remedy, each Discussion can be related to a ticket in the other tool. Therefore each discussion will have all the properties or similar properties of a ticket—e.g. priority, sla, assignee name, created by, category etc.

Escalation of Discussions

A Support discussion can be escalated if the SLA for the same had been exceeded. When such escalations happen the managers responsible for such channels will be intimated of the breach by mail.

There is also another reason for discussion escalation. When a discussion is initiated in an L1 support channel (the Service Desk), the L1 user would not immediately resolve the user query all by himself. Based on the problem description he would assign the discussion to the corresponding L2 support channel. The assigning is done by means of "escalating the discussion to another channel". This can propagate to L3 support team in a similar fashion if the need be. For example, suppose there is an error as follows: "Error in Application XYZ access". Once this error is raised in L1 channel, the support user would find from the user that it is an dotnet application. If so, he would know that only the L2 middleware team can handle and resolve this. So he would escalate the discussion to that particular channel.

Without disturbing the regular display in a channel, one or more users can participate in a specific in a separate discussion view, users can chat either in the main channel or from the discussion view. Whilst the channel would also be displayed in the normal view, support users and requesters can have focused discussion under discussion view. Anyone commenting on the ongoing discussion would also be visible in the discussion view. This is advantageous because in a support environment, it becomes very difficult to discriminate which user is answered if large number of users are raising requests.

In addition, according to the disclosed embodiment, discussions can be escalated into different channels that are dedicated or more focused or relevant to the discussion.

Migration of Discussions

Just as channels can be migrated to different users, discussions also can be migrated to different channels. For example, suppose a user discusses about "Sharepoint upgradation" in the knowledge channel "Sharepoint Development" not aware of the existence of a more apt channel called "Sharepoint Installation". The channel owner of the "Sharepoint Development" channel notices that the discussion is in the wrong place and he can simply right-click on the discussion and select "Migrate Discussion" option. From the list of available channels, he can choose the apt one. The entire discussion would now be migrated to the correct channel.

Figure 7:
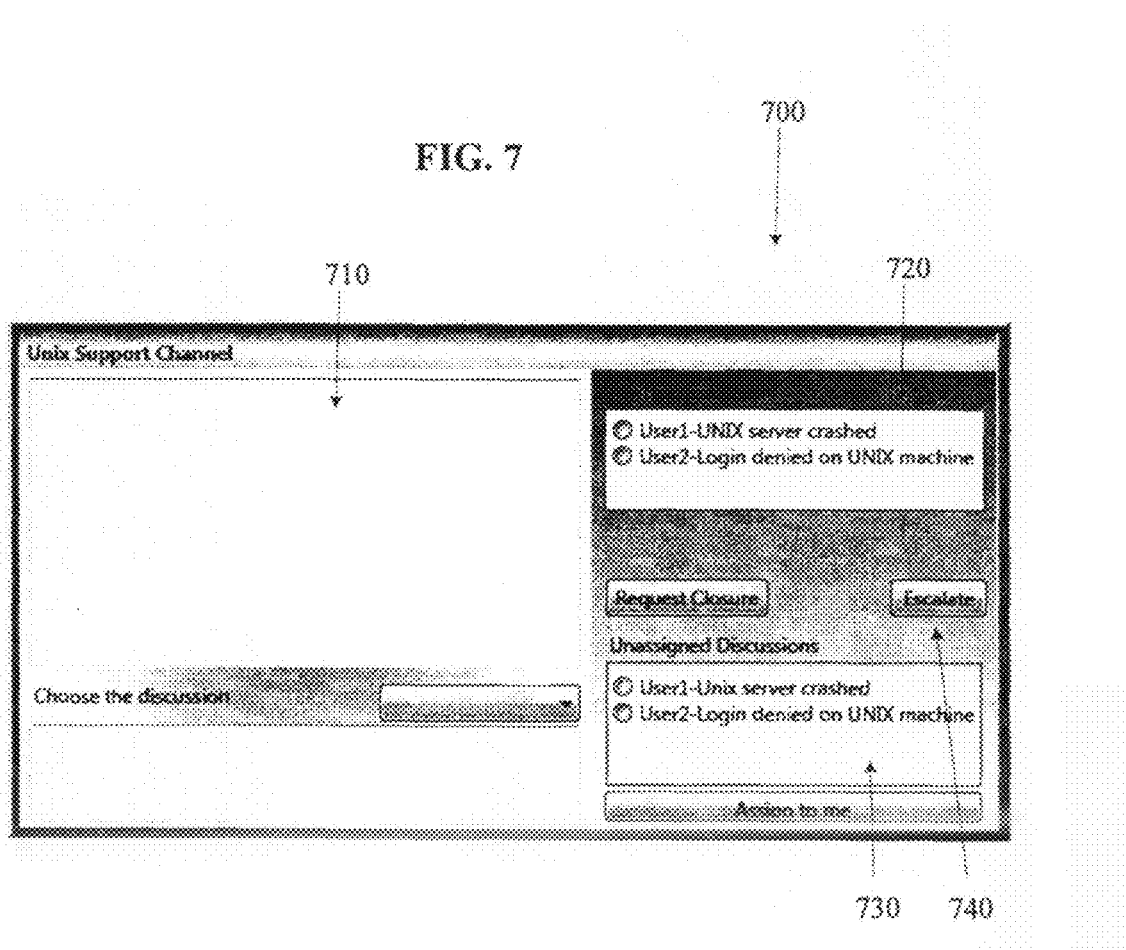
FIG. 7 illustrates an exemplary interface according to the disclosed embodiment.
Figure 8:
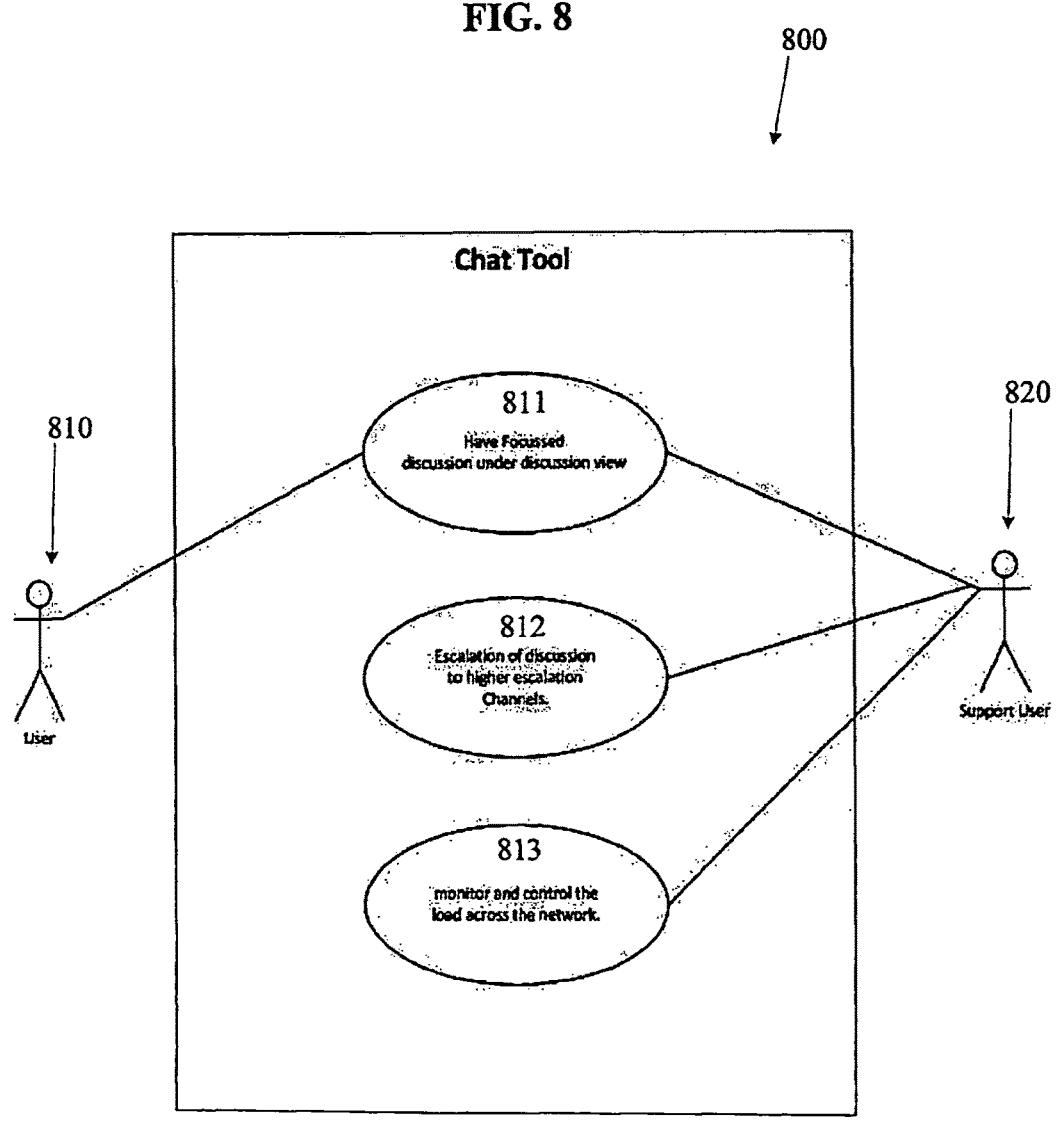
FIG. 8 illustrates an exemplary process flow for discussion escalation according to the disclosed embodiment.

This can be done by a computing device, for example, in response to an input from a user, and the discussion can be migrated from a user's current channel to an escalation channel without having to ask the user to raise the same request again on other channel. This feature helps in improving user experience and multiple tickets would not be escalated for the same issue and a smooth flow of information collected from the user from the beginning would be captured as part of the same discussion. FIG. 7 illustrates an exemplary interface 700 which includes a list of a user's current discussions 720, a frame for current discussions 710, a listing of discussions that have not yet been assigned 730, and a button 740 for escalating a discussion to a different channel, for example. FIG. 8 further illustrates an exemplary process flow 800 for discussion escalation. A user 810 and/or a support user 820 can have a focused discussion under a discussion view 811. If desired, the discussion can be escalated to a higher escalation channel in step 812. Support user 820 can also monitor and control the load across various servers in step 813 as needed.

Dynamic Categorizing of Discussions

When a user initiates a discussion, and after some back and forth conversations between him and the Support Channel user, the Admin User/the Support User would be able to categorize the discussion under particular sections that would depend upon various factors like Domain, Version, Product Name, Application Layer (application layer, middle tier etc.).

Scenario: A Discussion about installing a Sharepoint 2010 server might be categorized as Domain:Microsoft(could be Linux), Area:Sharepoint(could be dotNet, Visual Basic, Office), Product Name:Sharepoint Server(could be Sharepoint Designer), Version: 2010(could be 2007), Product Name:Sharepoint Server. It need not be only these five categories. It could be classified into even more granular level. So instead of giving a fixed set of categories, the system provides a facility to categorize it in a flexible manner. He would give the categorization in a nested syntax. This would be used for searching discussions easily. When a User types a word in any of the five categories, the other fields would be filled accordingly. In case of multiple options, User would be prompted to select one.

Dashboard

A dashboard will be provided in the Chat admin module, which will help in monitoring all the aspects of the tool. The various charts and reports included may include:

Most Frequently Used channels: This section will be represented by a Bar chart. The five (which is configurable) most frequently used channels will be shown in the descending order.

Channels with most number of active users: The first five (configurable) channels with most number of active users will be represented in a bar chart and the same will be available in a Pie chart as well.

Trend graph for channels: This is a line graph, which will give the trend in terms of traffic in each channel, with respect to the selected date range. The administrator can avail this report for selected channels or for all channels.

Channel member count: A bar chart, which shows the channels having the highest number of user subscriptions which are arranged in descending order.

Most active channels: This will be a Pie chart, which represents the five (configurable) most active channels in terms of message.

Least Used channels: Least used channels will be represented in a Bar chart, by default it will be shown for five least used channels and which is configurable.

Primary's health status for a channel: The health status of a particular channel's primary will be represented as a Pie chart in this section. And this will be updated in regular intervals.

Channel having most number of discussions: The channels which are having most number of discussions (Either support\knowledge channels) will be represented as bar chart in this section. The number of channels to be displayed is configurable.

Discussion Ratings

Users can rate the discussion indicating how useful they found the discussion to be, and the ratings may be used while searching to discussions. For example, if a user searches for a discussion topic, the discussions may be displayed in descending order of the ratings (discussion with the highest rating is displayed first).

Web Based Administration

A web based administration module can be used to aid user and channel management. The web based administration module helps in user management which includes adding users, editing users, removing users and managing permissions. It also includes channel management as well which aids adding channels, editing channels, removing channels and undeleting channels. It further includes management of user mapping to channels. Since it is a web based tool, the concerned users can access it from any part of the world without installers or supporting tools. Thus making maintenance and management of the tool hassle free.

Ability to Interface with External Tools

The tools of the disclosed embodiment can also interface with external tools like BMC Remedy or any other monitoring or ticketing tool. If the external tools give access to some of their services through web services then those services can be accessed and subsequently processed in this tool. It will be done by implementing listeners for those services in this tool. This functionality means that the tool is extendable and use intelligently the functionalities of other tools. For example, once an incident ticket is created in BMC Remedy tool, a support channel discussion can be initiated between the ticket assignee (one of the users in the support channel) and the user who raised the ticket. The discussion's SLA would depend upon the SLA of the original ticket from BMC. And if the support user resolves the incident through the discussion, the BMC ticket's status also can be changed to resolved through the respective web-service call. The disclosed embodiment also provides a user-friendly interface where listeners can be dragged and dropped from a list of available web-services from the registered external tools.

Mechanism to Preventing Deadlock

In the decentralized mode, at any point of time, if the Primary for a channel is available, it can take the responsibility to find a new Secondary if none were available already. Similarly, the responsibility to find a new Tertiary when none is already available can fall on the existing Secondary. In the rare cases when the Secondary had just gone down unexpectedly without notifying others, the Primary can take the responsibility. When the Primary is not available, and if the Secondary is available, then the Secondary can promote itself as Primary. When the Primary and the Secondary have crashed unexpectedly, the Tertiary can promote itself as the new Primary and would take the responsibility to find a new Secondary and a new Tertiary. These rules ensure that there is no deadlock occurring while migrating a channel.

Figure 9:
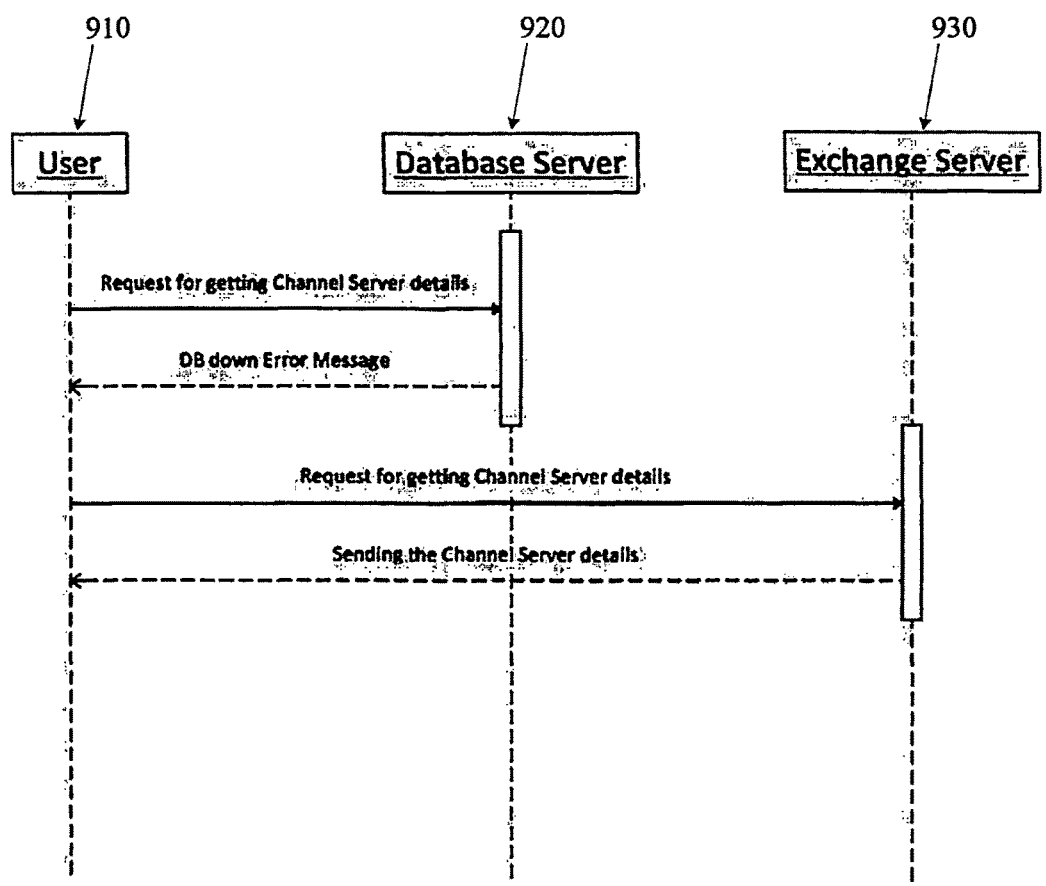
FIG. 9 illustrates a illustrates an exemplary sequence for exchanging information between a user device, a database server, and an exchange server according to the disclosed embodiment.

Recovery Mechanism from Database Failure:

The Database of the disclosed embodiment is a very important component of the whole system. Its failure would impact the whole system as the clients in the tool are storing minimal information and they store every other data (chat messages, discussions, channel details, user details, channel anchor details) in the central database. For this reason, the tool of the disclosed embodiment can sync with an Exchange Server that has a public account for each channel. It will have the recent anchor details of a particular channel at any point of time. The name of the account will be configured at the setup and so all the Users will be knowing about it. When a new User logs in and finds no database to get all the details, he sends out a mail to the Exchange server. It would respond with the correct details with which the User can establish connection with the anchors. If the database crashes, all the information need to be stored at the client site itself for time being until the database recovers. It can use its local Microsoft Access Database, for example, for that. Once the connections are back, the records will be merged with the Database. Each Primary will take care of the Channel it is maintaining, so it would be easy when the final merging happens. FIG. 9 illustrates an exemplary sequence for exchanging information between a user device 910, a database server 920, and an exchange server 930.

Network Failure

Network failure can happen among certain users of the network only. For instance, there could be a connection slack in a sub-network of a bigger network. A typical scenario and an exemplary solution according to the disclosed embodiment is as follows. A particular user alone would not be able to contact the Primary of a Channel, but he can connect to the Secondary in a perfect manner. In such special cases, the Secondary would find that the particular user is not able to reach the Primary and so it would act as a Primary and relay messages just for that user alone. The solution can be modified for other cases of similar network failure. This would be done till the threshold number of users are not impacted (for that channel) if exceeded the secondary would request Primary to relinquish ownership and declare itself as Primary & tertiary as Secondary. Secondary than should search for new Tertiary.

Client Side Database:

Each user will preferably have a client-side database (Microsoft Access/Binary file can be used for this) that would act as cache and thereby result faster performance. Details such as themes, tool preferences, names of users that the user wanted to be blocked from his view, recent messages of the channels the user visits often etc. If configured whenever messages are sent from user to Primary, it is also stored locally. It would be helpful in case the Primary crashed and there are no other Secondary or Tertiary at the time. The users could relay their recent messages to the new Primary and hence restore normality in the system.

Figure 10:
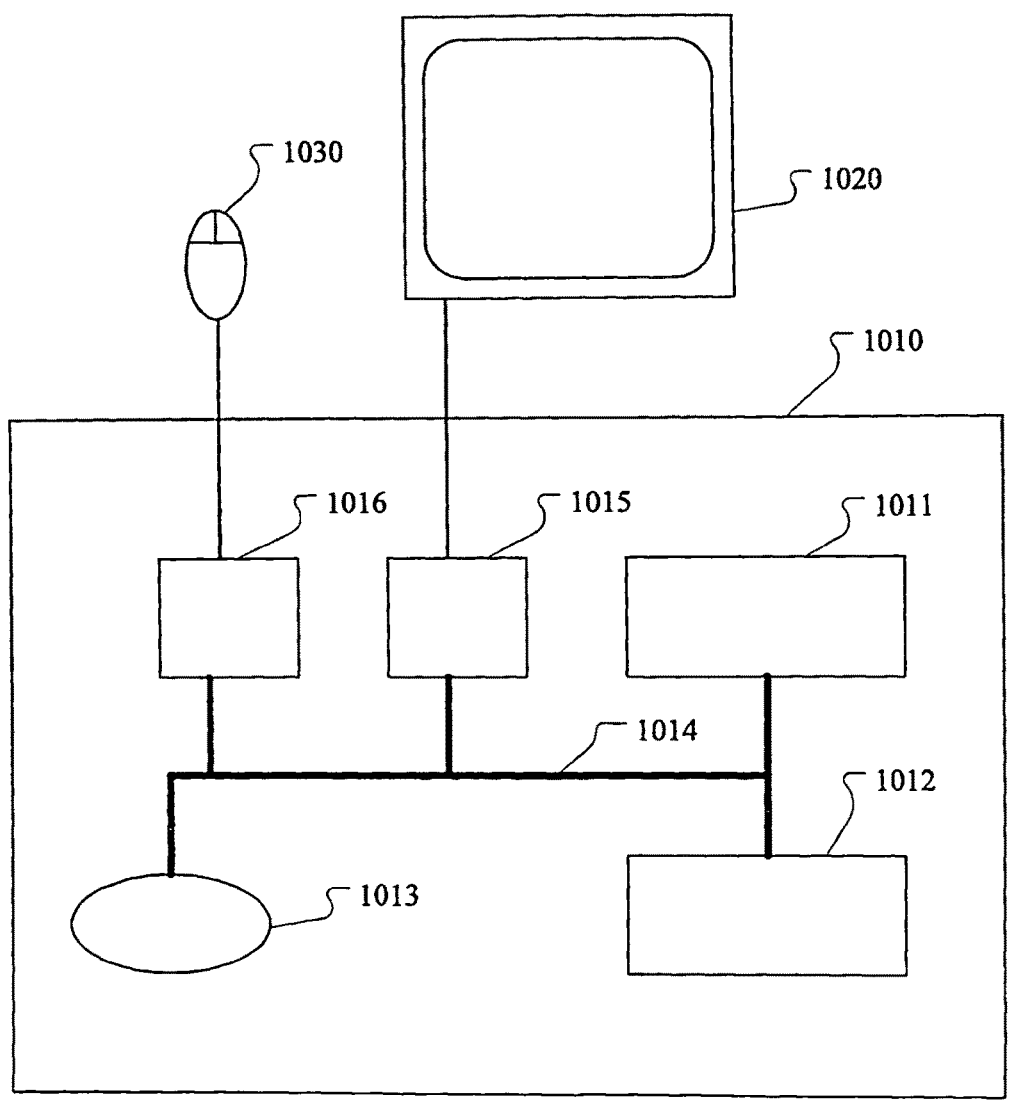
FIG. 10 illustrates an exemplary computing device according to the disclosed embodiment.

The embodiments described herein may be implemented with any suitable hardware and/or software configuration, including, for example, modules executed on computing devices such as computing device 1010 of FIG. 10. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1010 has one or more processing device 1011 designed to process instructions, for example computer readable instructions (i.e., code) stored on a storage device 1013. By processing instructions, processing device 1011 may perform the steps set forth in the methods described herein. Storage device 1013 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1010 additionally has memory 1012, an input controller 1016, and an output controller 1015. A bus 1014 operatively couples components of computing device 1010, including processor 1011, memory 1012, storage device 1013, input controller 1016, output controller 1015, and any other devices (e.g., network controllers, sound controllers, etc.). Output controller 1015 may be operatively coupled (e.g., via a wired or wireless connection) to a display device 1020 (e.g., a monitor, television, mobile device screen, touch-display, etc.) In such a fashion that output controller 1015 can transform the display on display device 1020 (e.g., in response to modules executed). Input controller 1016 may be operatively coupled (e.g., via a wired or wireless connection) to input device 1030 (e.g., mouse, keyboard, touch-pad, scroll-ball, touch-display, etc.) In such a fashion that input can be received from a user (e.g., a user may input with an input device 1030 a dig ticket).

Of course, FIG. 10 illustrates computing device 1010, display device 1020, and input device 1030 as separate devices for ease of identification only. Computing device 1010, display device 1020, and input device 1030 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 1010 may be one or more servers, for example a farm of networked servers, a clustered server environment, or a cloud network of computing devices.

While systems and methods are described herein by way of example and embodiments, those skilled in the art recognize that the disclosed embodiment is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A computer-implemented method executed by one or more computing devices of a centralized server computer for improving collaborative communication, the method comprising:
   receiving, by at least one of the one or more computing devices, information corresponding to a user of a collaboration platform, the collaboration platform being associated with a plurality of collaboration channels, wherein the plurality of collaboration channels include a support channel anchored by the server computer, an alert channel anchored by the server computer, and a knowledge channel initially anchored by the server computer;
   in response to the server computer experiencing high load, migrating the knowledge channel to be anchored by the client device;
   determining, by at least one of the one or more computing devices, that the information corresponding to the user includes a query from the user and at least one of the collaboration channels is most relevant for the user based on the content of the received information;
   routing, by at least one of the one or more computing devices, the query from the user to the at least one collaboration channel determined to be the most relevant for the user;
   determining by a support user that a discussion is to be bound by a Service Level Agreement (SLA) and setting the SLA; and
   catching an alert from a web service and raising an alert on the alert channel based on the caught alert from the web service.

2. The method of claim 1, wherein the information corresponding to the user includes user profile information.

3. The method of claim 1, wherein anchoring a particular collaboration channel comprises hosting the particular collaboration channel and updating discussions of the particular collaboration channel to a centralized database.

4. The method of claim 1, further comprising executing a predefined script in response to detecting the raised alert on the alert channel.

5. The method of claim 1, wherein the knowledge channel is a restricted channel having access restricted to members with access permission, and the support channel is an open channel having no restricted access.

6. An apparatus for improving collaborative communication using a collaboration platform having a mixed-mode architecture, the apparatus comprising:
   a centralized server computer comprising one or more processors, the centralized server computer in communication with a client device of the collaboration platform; and
   one or more memories operatively coupled to at least one of the one or more processors and storing instructions that, when executed by at least one of the one or more processors, cause at least one of the one or more processors to:
      receive information corresponding to a user of a collaboration platform, the collaboration platform being associated with a plurality of collaboration channels, wherein the plurality of collaboration channels include a support channel anchored by the centralized server computer, an alert channel anchored by the centralized server computer, and a knowledge channel initially anchored by the centralized server computer;
      in response to the centralized server computer experiencing high load, migrating the knowledge channel to be anchored by the client device;
      determine that the information corresponding to the user includes a query from the user and at least one of the collaboration channels is most relevant for the user based on the content of the received information;
      route the query from the user to the at least one collaboration channel determined to be the most relevant for the user;
      receive an indication that a discussion of the support channel is bound by a Service Level Agreement (SLA) and bind the discussion to the SLA;
      catch an alert from a web service and raise an alert on the alert channel based on the caught alert from the web service.

7. The apparatus of claim 6, wherein the information corresponding to the user includes user profile information.

8. The apparatus of claim 6, wherein anchoring a particular collaboration channel comprises hosting the particular collaboration channel and updating discussions of the particular collaboration channel to a centralized database.

9. The apparatus of claim 6, wherein the one or more memories further comprise instructions that, when executed by at least one of the one or more processors, cause at least one of the one or more processors to execute a predefined script in response to detecting the raised alert on the alert channel.

10. The apparatus of claim 6, wherein the knowledge channel is a restricted channel having access restricted to members with access permission, and the support channel is an open channel having no restricted access.

11. At least one non-transitory computer-readable medium storing computer-readable instructions that, when executed by a centralized server computer, improve collaborative communication, the instructions causing the centralized server computer to:
   receive information corresponding to a user of a collaboration platform, the collaboration platform being associated with a plurality of collaboration channels, wherein the plurality of collaboration channels include a support channel anchored by the server computer, an alert channel anchored by the server computer, and a knowledge channel initially anchored by the server computer;

in response to the server computer experiencing high load, migrating the knowledge channel to be anchored by a client device in communication with the server computer;

determine that the information corresponding to the user includes a query from the user and at least one of the collaboration channels is most relevant for the user based on the content of the received information;

route the query from the user to the at least one collaboration channel determined to be the most relevant for the user;

receive an indication that a discussion of the support channel is bound by a Service Level Agreement (SLA) and bind the discussion to the SLA;

catch an alert from a web service and raise an alert on the alert channel based on the caught alert from the web service.

12. The at least one non-transitory computer-readable medium of claim 11, wherein the information corresponding to the user includes user profile information.

13. The at least one non-transitory computer-readable medium of claim 11, wherein anchoring a particular collaboration channel comprises hosting the particular collaboration channel and updating discussions of the particular collaboration channel to a centralized database.

14. The at least one non-transitory computer-readable medium of claim 11, wherein the knowledge channel is a restricted channel having access restricted to members with access permission, and the support channel is an open channel having no restricted access.

* * * * *